(12) United States Patent
Whitaker (10) Patent No.: US 10,590,725 B2
(45) Date of Patent: Mar. 17, 2020

(54) OPTICAL ALIGNMENT SYSTEM FOR BEAM PUMPING UNIT

(71) Applicant: Lufkin Industries, LLC, Lufkin, TX (US)

(72) Inventor: Justin Heath Whitaker, Shafter, CA (US)

(73) Assignee: Lufkin Industries, LLC, Lufkin, TX (US)

( * ) Notice: Subject to any disclaimer, the term of this patent is extended or adjusted under 35 U.S.C. 154(b) by 106 days.

(21) Appl. No.: 15/422,337

(22) Filed: Feb. 1, 2017

(65) Prior Publication Data

US 2017/0218715 A1   Aug. 3, 2017

Related U.S. Application Data

(60) Provisional application No. 62/290,675, filed on Feb. 3, 2016.

(51) Int. Cl.
*E21B 33/03*   (2006.01)
*E21B 47/00*   (2012.01)
(Continued)

(52) U.S. Cl.
CPC ............ *E21B 33/03* (2013.01); *E21B 43/127* (2013.01); *E21B 47/00* (2013.01);
(Continued)

(58) Field of Classification Search
CPC ........ E21B 33/03; E21B 43/127; E21B 47/00; E21B 47/09; G01B 11/27; G01C 15/105
See application file for complete search history.

(56) References Cited

U.S. PATENT DOCUMENTS 2,117,522 A * 5/1938 Straatman ............. E21B 47/024
  33/285
5,084,980 A * 2/1992 Skopec ................... E21B 25/16
  33/228

(Continued)

FOREIGN PATENT DOCUMENTS

CN   203443561 U   2/2014
CN   203626654 U   6/2014
(Continued)

OTHER PUBLICATIONS

All-in-one laser machine alignment with ROTALIGN Ultra iS by PRUFTECHNIK. Made available by PRUFTECHNIK Group. Published on Feb. 5, 2014. Available from https://www.youtube.com/watch?v=a13xmbC8s0s (Year: 2014).*

(Continued)

*Primary Examiner* — Blake E Michener
*Assistant Examiner* — Theodore N Yao
(74) *Attorney, Agent, or Firm* — Crowe & Dunlevy, P.C.

(57) ABSTRACT

A method for aligning a pump with a wellhead begins with the steps of attaching a target assembly to the pump and attaching an emitter assembly to the wellhead. The method continues with the step of emitting a beam of light from the emitter assembly to the target assembly. The method concludes with the step of determining the position of the pump with respect to the wellhead by evaluating the projection of the light beam on the target assembly. Based on this determination, the pump can be accurately aligned with the wellhead.

16 Claims, 6 Drawing Sheets

(51) Int. Cl.
    *E21B 43/12* (2006.01)
    *G01C 15/10* (2006.01)
    *G01B 11/27* (2006.01)

(52) U.S. Cl.
    CPC .......... *E21B 47/0008* (2013.01); *G01B 11/27* (2013.01); *G01C 15/105* (2013.01)

(56) References Cited

U.S. PATENT DOCUMENTS

| | | | |
|---|---|---|---|
| 5,864,956 A * | 2/1999 | Dong | G01B 11/26 33/227 |
| 7,042,555 B1 | 5/2006 | Lawson | |
| 2002/0053144 A1* | 5/2002 | Matsumoto | G01C 15/105 33/283 |
| 2015/0055142 A1* | 2/2015 | Raglin | E21B 47/0008 356/614 |

FOREIGN PATENT DOCUMENTS

| | | |
|---|---|---|
| CN | 204716156 U | 10/2015 |
| WO | 2015014163 A1 | 2/2015 |

OTHER PUBLICATIONS

Lufkin, Conventional & Reverse Mark Pumping Units, Operator's Manual (Year: 2013).*
Lufkin, Conventional & Reverse Mark Pumping Units, Operator's Manual (2013).
API; Recommended Practice for Installation, Maintenance, and Lubrication of Pumping Units (2013).
International Search Report and Written Opinion issued in connection with corresponding PCT Application No. PCT/US2017/016293 dated Apr. 13, 2017.

* cited by examiner

OPTICAL ALIGNMENT SYSTEM FOR BEAM PUMPING UNIT

RELATED APPLICATIONS

This application claims the benefit of U.S. Provisional Patent Application Ser. No. 62/290,675, filed Feb. 3, 2016, entitled "Beam Pumping Unit Laser Alignment," the disclosure of which is hereby incorporated by reference.

FIELD OF THE INVENTION

This invention relates generally to oilfield equipment, and more particularly, but not by way of limitation, to a system and method for aligning a beam pumping unit over a wellhead.

BACKGROUND

Hydrocarbons are often produced from well bores by reciprocating downhole pumps that are driven from the surface by pumping units. A pumping unit is connected to its downhole pump by a rod string. Although several types of pumping units for reciprocating rod strings are known in the art, walking beam style pumps enjoy predominant use due to their simplicity and low maintenance requirements.

Each beam pump unit should be positioned so that the horsehead is properly positioned above the production tubing. This allows the bridle to travel vertically when raising and lowering the sucker rod. Not having a horsehead in this position can produce an offset force between the polish rod and the bridle, which may result in wear and increased friction between the polish rod and the stuffing box and tee. One possible consequence of this offset and friction is that the contents of the stuffing box may prematurely wear and deteriorate. If this occurs and the stuffing box is not timely repaired, a leak of the production fluid may develop, possibly causing an environmental hazard.

The alignment between the well bore and the beam pump is typically done at the time the well is completed and the beam pump is installed. Realignment may be necessary if the pump unit shifts or is serviced. One prior art method of performing this alignment involves hanging a plumb bob from the horsehead to find the location of the pump unit relative to the production tubing. This usually requires the bridle to be pulled away from the horsehead and the plumb bob string placed in the bridle groove or at another place on the horsehead above the center of the production tubing. An observer then sights the location of the plumb bob relative to the center of the production tubing.

Although widely adopted, the line suspending the plumb bob is subject to the vagaries of the weather; a small breeze may have the result of producing a misalignment between the horsehead and the center of the production tube. Additionally, the resting point of the plumb bob may be subjective to the eye and may not yield a true alignment if the bob is not unquestionably at a point resting immediately above the center of the polish rod. There is, therefore, a need for a cost-effective solution for aligning the pump unit with the wellhead that overcomes these and other deficiencies in the prior art.

SUMMARY OF THE INVENTION

In one aspect, the present invention includes a method for aligning a pump with a wellhead. The method begins with the steps of attaching a target assembly to the pump and attaching an emitter assembly to the wellhead in a first position. The method continues with the step of emitting a beam of light from the emitter assembly to the target assembly. The method concludes with the step of determining the position of the pump with respect to the wellhead by the projection of the light beam on the target assembly.

In another aspect, the present invention includes a method for aligning a pump with a wellhead, where a polish rod extends upward from the wellhead. The method begins with the step of attaching a target assembly to the pump. Next, the method includes the step of attaching an emitter assembly to the polish rod in a first position and emitting a beam of light from the emitter assembly to project a first line on the target assembly, where the first line is substantially parallel to a first major axis between the pump and the wellhead. Next, the method includes the step of determining the position of the pump with respect to the wellhead by evaluating the projection of the first line against the reference marks on the target assembly. The method continues with the step of adjusting the position of the pump with respect to the wellhead based on the determined position of the pump.

Next, the method includes the step of rotating the emitter assembly to a second position on the polish rod and emitting a beam of light from the emitter assembly to project a second line on the target assembly. The second line is substantially parallel to a second major axis between the pump and the wellhead. The method continues with the step of determining the position of the pump with respect to the wellhead by evaluating the projection of the second line against the reference marks on the target assembly. The method concludes with the step of adjusting the position of the pump with respect to the wellhead based on the determined position of the pump.

In yet another embodiment, the invention includes an optical alignment system configured to determine lateral and longitudinal offset between a pump jack and a wellhead. The optical alignment system includes a target assembly that is configured to be secured to the pump jack. The target assembly includes a target that faces the wellhead. The optical alignment system further includes an emitter assembly that is configured to be secured directly or indirectly to the wellhead. The emitter assembly includes an emitter that is configured to project one or more visible lines onto the target.

WRITTEN DESCRIPTION

Figure 1:
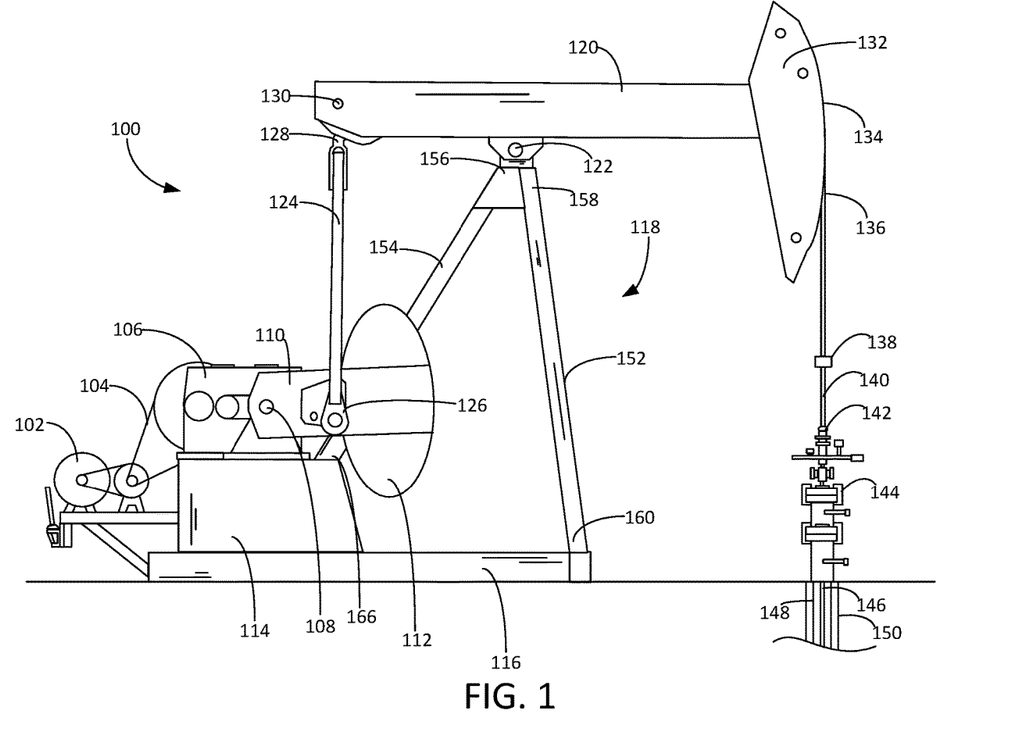
FIG. 1 depicts a beam pumping unit operating on a well.

FIG. 1 shows a class 1 beam pump jack 100. The pump jack 100 is driven by a prime mover 102, typically an electric motor or internal combustion engine. The rotational power output from the prime mover 102 is transmitted by a drive belt 104 to a gearbox 106. The gearbox 106 provides low-speed, high-torque rotation of a crankshaft 108. Each end of the crankshaft 108 (only one is visible in FIG. 1) carries a crank arm 110 and a counterbalance weight 112. The reducer gearbox 106 sits atop a sub-frame or pedestal 114, which provides clearance for the crank arms 110 and counterbalance weights 112 to rotate. The gearbox pedestal 114 is mounted atop a base 116. The base 116 also supports a Samson post 118. The top of the Samson post 118 acts as a fulcrum that pivotally supports a walking beam 120 via a saddle bearing assembly 122, commonly referred to as a center bearing assembly.

Each crank arm 110 is pivotally connected to a pitman arm 124 by a crank pin bearing assembly 126. The two pitman arms 124 are connected to an equalizer bar 128, and the equalizer bar 128 is pivotally connected to the rear end of the walking beam 120 by an equalizer bearing assembly 130. A horsehead 132 with an arcuate forward face 134 is mounted to the forward end of the walking beam 120. The face 134 of the horsehead 132 interfaces with a flexible wire rope bridle 136. At its lower end, the bridle 136 terminates with a carrier bar 138, upon which a polish rod 140 is suspended.

The polish rod 140 extends through a packing gland or stuffing box 142 on a wellhead 144. A rod string 146 of sucker rods hangs from the polish rod 140 within a tubing string 148 located within the well casing 150. The rod string is connected to the plunger of a subsurface pump (not illustrated). In a reciprocating cycle of the pump jack 100, well fluids are lifted within the tubing string 148 during the rod string 146 upstroke. It will be appreciated that the pump jack 100 depicted in FIG. 1 is merely an exemplar and is not intended to limit the scope of the alignment system and method described in this disclosure.

Figure 2:
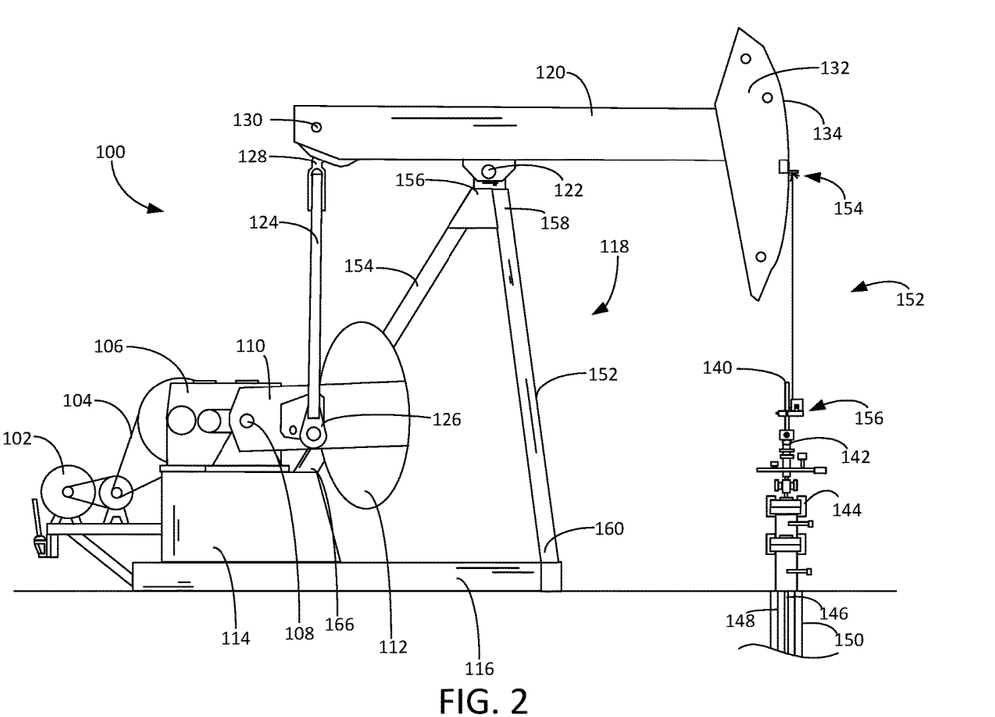
FIG. 2 depicts the pumping unit of FIG. 1 during an alignment procedure.

Turning to FIG. 2, shown therein is the pump jack 100 from FIG. 1 undergoing an installation or adjustment procedure using an optical alignment system 152. Generally, the optical alignment system 152 is used to determine the extent of alignment between the pump jack 100 and the polish rod 140 when it is positioned within the wellhead 144. Based on information provided by the optical alignment system 152, the pump jack 100 can be moved longitudinally and laterally so that the pump jack 100 is properly aligned with the wellhead 144. As used in this disclosure, the term "longitudinal" refers to movement or distance along the line extending between the pump jack 100 and the wellhead 144. The term "lateral" refers to movement or distance along a line that is perpendicular to the longitudinal axis. It will be understood that the longitudinal and lateral axes each constitute a major axis.

The optical alignment system 152 includes two primary components: a target assembly 154 and an emitter assembly 156. In exemplary embodiments, the emitter assembly 156 is attached to the polish rod 140. The target assembly 154 is connected to the arcuate forward face 134 of the horsehead 132. As noted in FIG. 1, the bridle 136 has been removed from the horsehead 144 to better illustrate the form and function of the optical alignment system 152.

Figure 3:
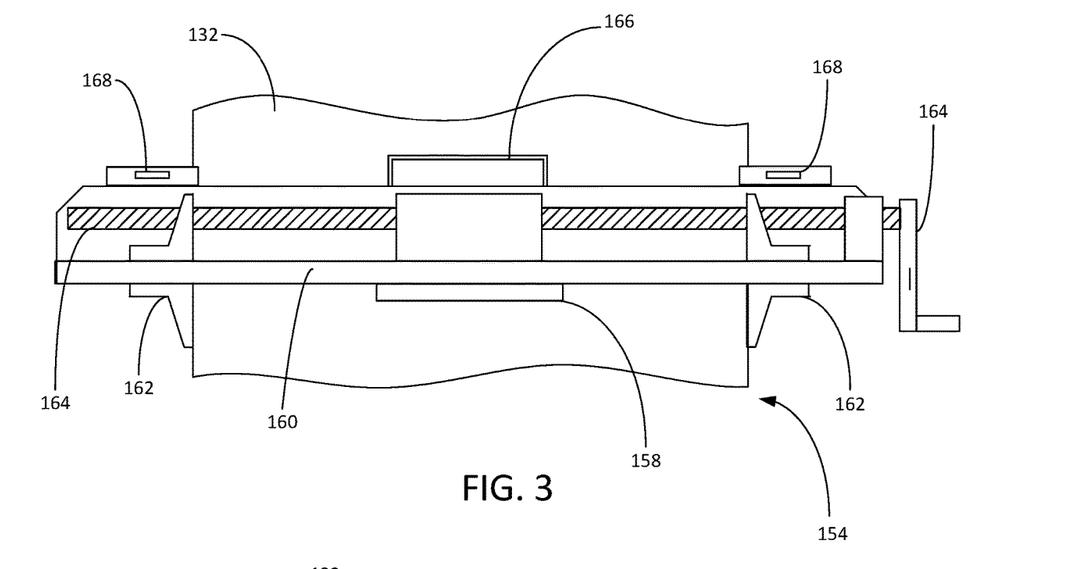
FIG. 3 is a front view of the target assembly.
Figure 4:
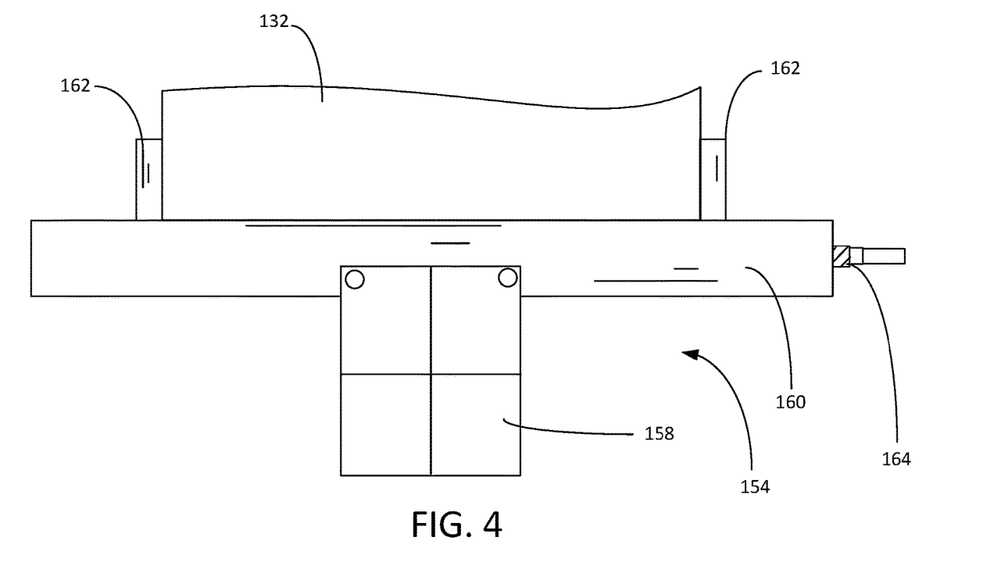
FIG. 4 is a bottom view of the target assembly of FIG. 3.

Turning to FIGS. 3 and 4, shown therein are front and bottom views, respectively, of the target assembly 154 as installed on the horsehead 132 (partially shown). The target assembly 154 includes a target 158 connected to a body 160. The target assembly 154 also includes a pair of clamps 162 that are configured for opposite movement within the body 160 in response to the manipulation of an adjustment crank 164. In the exemplary embodiment depicted in FIGS. 3 and 4, turning the adjustment crank 164 rotates a threaded rod 166 that causes the clamps 162 to move in opposite directions. As best shown in FIG. 4, the clamps 162 are sized and configured to grasp the outside of the horsehead 132, with the target 158 facing down toward the wellhead 144. The simultaneous, coordinated movement of the clamps 162 centers the target assembly 154 on the horsehead 132.

The target assembly 154 may also include a support ring 166 connected to the body 160. The support ring 166 can be used to tether the target assembly 154 to the horsehead 132 with a cable or wire rope. The target assembly 154 optionally includes levels 168 that can be used to ensure that the target assembly 154 is positioned in a horizontal position on the horsehead 132. In some embodiments, the target assembly 154 is placed on the horsehead 132 just below the apex of the arcuate forward face 134.

The target 158 may include reference markings that indicate the longitudinal and lateral axes between the pump jack 100 and the wellhead 144. The target assembly 154 is secured to the horsehead 132 in a level orientation where the center of the target 158 is located along the same vertical axis that would pass through the polish rod 140 when it is suspended from the horsehead 132 by the bridle 136 and carrier bar 138. In some embodiments, the target 158 includes a level (not shown) that can be used to ensure that the target 158 is oriented in a horizontal plane that is perpendicular to the vertical axis extending through the center of the polish rod 140.

Figures 5, 6:
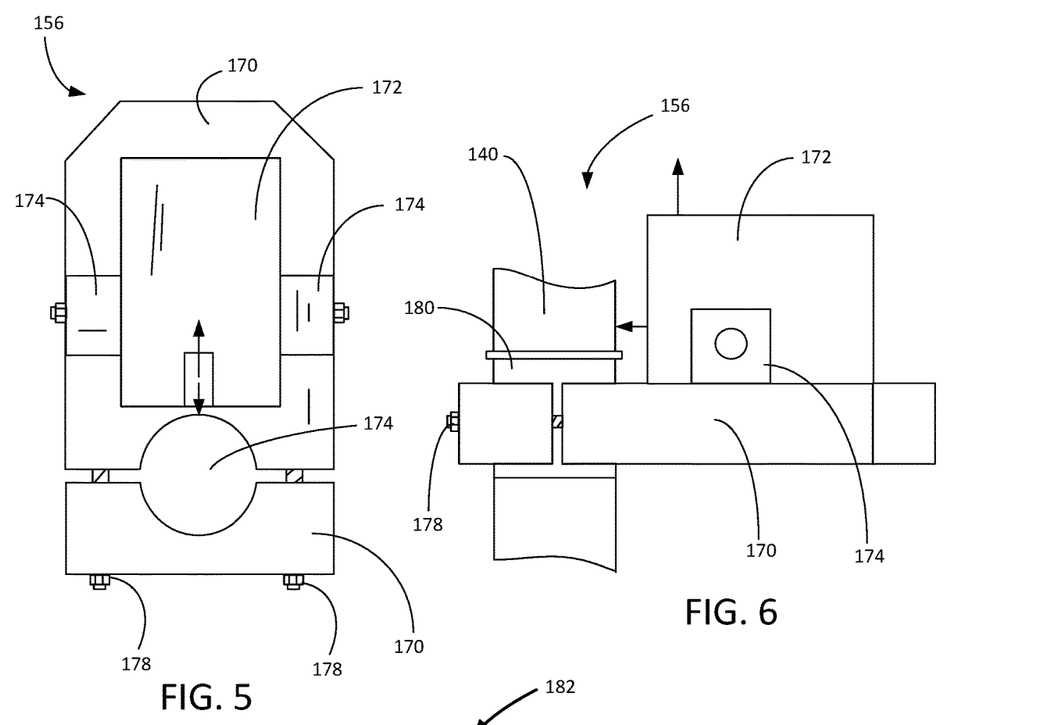
FIG. 5 is a top view of the emitter assembly.
FIG. 6 is a side view of the emitter assembly of FIG. 5.

Turning to FIGS. 5 and 6, shown therein are top and side views, respectively, of the emitter assembly 156. The emitter assembly 156 includes a base 170, an emitter 172 and emitter supports 174. The base 170 includes an aperture 176 that is configured to admit the polish rod 140. In the embodiment depicted in FIGS. 5 and 6, the base 170 is separated into two parts that are connected with fasteners 178. Tightening the fasteners clamps the base 170 around the polish rod 140 (as best seen in FIG. 6). A bushing 180 can be placed into the aperture 176 to provide a better fit and grip between the base 170 and the polish rod 140. It will be understood that the lower portion of the polish rod 140 is rigidly captured within the wellhead 144 during this operation so that the upper portion of the polish rod 140 provides a stable base from which to suspend the emitter assembly 156. In this position, the polish rod 140 provides an indication and reference for the center of the tubing string 148.

The emitter 172 that is configured to project one or more visible lines onto the target 158. In exemplary embodiments, the emitter 172 is configured to simultaneously emit laser light in two directions, with each emission configured to produce a continuous visible line along the horizontal and vertical axes. Suitable laser emitters are available from Pacific Laser Systems, a division of Fluke Electronics, under the "PLS 180" brand. The emitter 172 may optionally be fitted with a self-leveling system that ensures that the lasers are emitted in substantially vertical and horizontal planes. The emitter 172 is supported by the base 170 and captured between the emitter supports 174. It will be appreciated that other optical targeting systems may be used in addition to, or as an alternative to, the emitter. For example, point-to-point laser systems may be used in place of the line systems described above. In another embodiment, two emitters 172 may be mounted on the base 170 at an angle apart to deliver a crosshair beam above the polish rod 140. In other embodiments, the emitter 172 is configured to project non-laser light onto the target 158.

Figure 7:
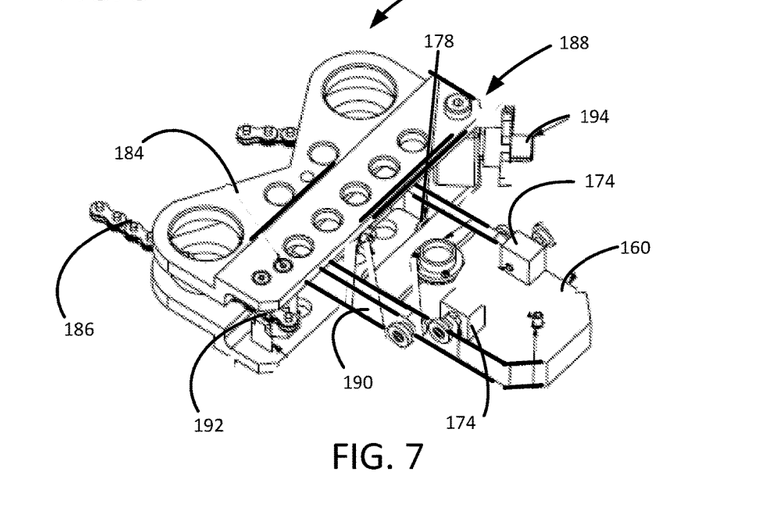
FIG. 7 is a perspective view of a chain clamp assembly connected to the body of the emitter assembly of FIG. 5.

Turning to FIG. 7, shown therein is a perspective view of the emitter assembly 156 and chain clamp 182. The chain clamp 182 provides an alternate mechanism for securing the emitter assembly 156 to the wellhead 144. The chain clamp 182 includes a V-block 184, a chain 186, a chain tensioner 188 and support brackets 190. The V-block 184 is sized and configured to be pressed against a cylindrical portion of the wellhead 144. The chain tensioner 188 includes a clasp 192 and an adjustment dial 194. The support brackets 190 are releasably secured the body 160 of the emitter assembly 156. It will be appreciated that the emitter assembly 156 can be secured to the chain clamp 182 with the support brackets 190 before or after the chain clamp 182 is secured to the wellhead 144.

During use, a first end of the chain 186 is secured within the adjustment dial 194. The second end of the chain 186 is wrapped around the wellhead 144 and placed into the clasp 192 with a modest amount of tension applied by hand. The chain 186 is then tightened by turning the adjustment dial 194 to move the first end of the chain 186 away from the V-block 184, which increases the distance between the captured end of the chain 186 within the clasp 192 and adjustment dial 194. The tension supplied by the chain 186 presses the V-block 184 against the side of the wellhead 144, thereby providing a stable base on which the emitter assembly 156 can be suspended. The use of chain clamp 182 is particularly beneficial in applications in the pump jack 100 is being installed on a new wellhead 144 or in other situations in which the polish rod 140 is not present.

Figure 8:
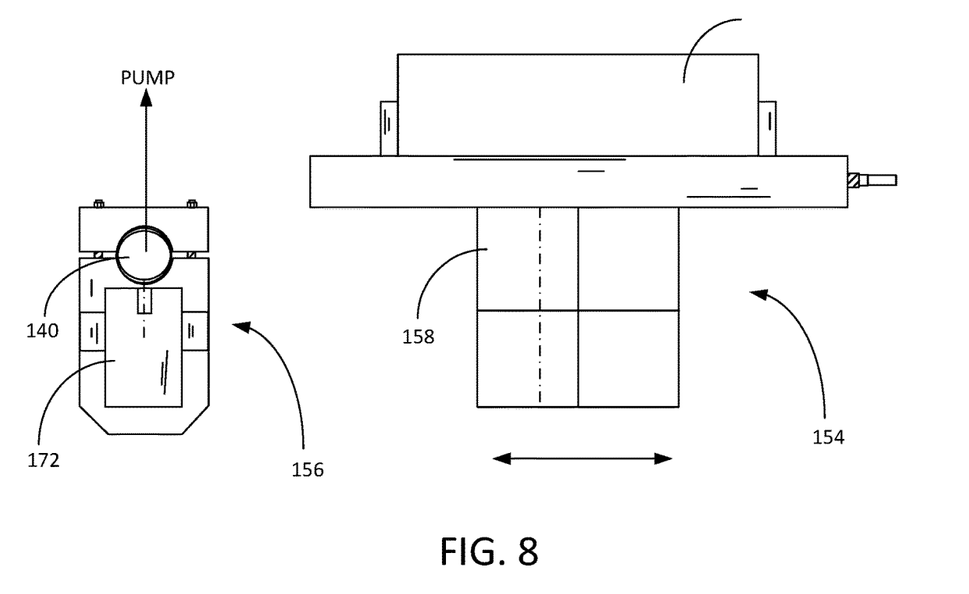
FIG. 8 is a depiction of the cooperative use of the emitter assembly and target assembly for a lateral alignment operation.
Figure 9:
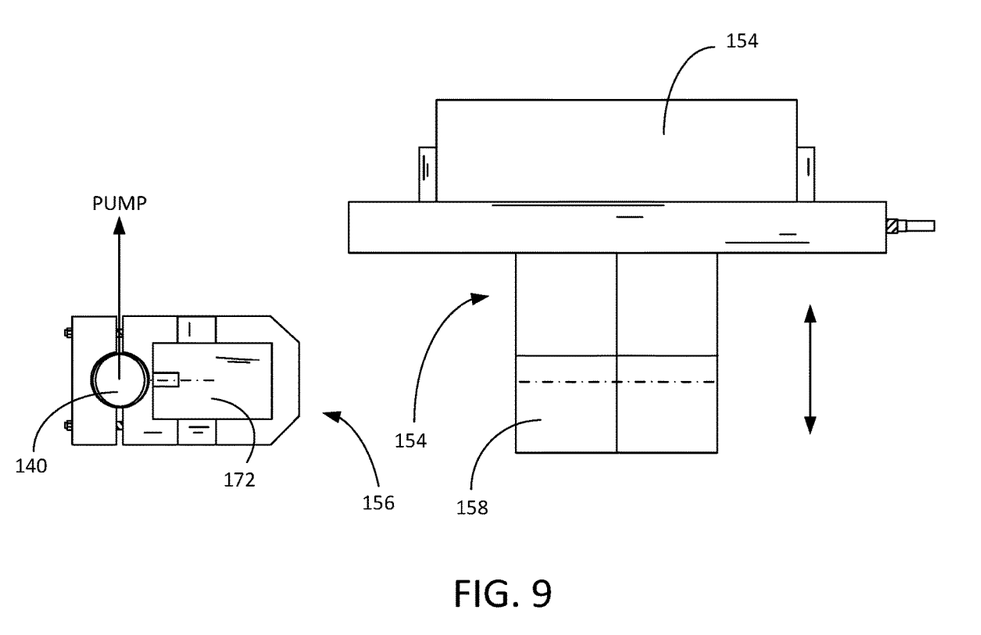
FIG. 9 is a depiction of the cooperative use of the emitter assembly and the target assembly for a longitudinal alignment operation.

Turning to FIGS. 8 and 9, shown therein are graphic representations of an alignment procedure carried out with the optical alignment system 152. In FIG. 8, the emitter assembly 156 has been connected to the polish rod 140 such that the vertical laser produces a line that runs substantially parallel to the longitudinal axis to the pump jack 100. In this position, the emitter 172 casts a line that contacts the target 158 and provides an indication of the lateral position of the pump jack 100 with respect to the center of the polish rod 140. The laser-line indication on the target 158 in FIG. 8 indicates that the pump jack 100 should be shifted slightly to the right (when looking at the wellhead 144 from the pump jack 100).

In FIG. 9, the emitter assembly 156 has been rotated 90° on the polish rod 140 such that the vertical laser produces a line that runs substantially parallel to the lateral axis between the pump jack 100 and the wellhead 144. In this position, the emitter 172 paints a line that contacts the target 158 and provides an indication of the longitudinal position of the pump jack 100 with respect to the center of the polish rod 140. The laser-line indication on the target 158 in FIG. 9 indicates that the pump jack 100 should be shifted slightly forward toward the wellhead 144.

Figure 10:
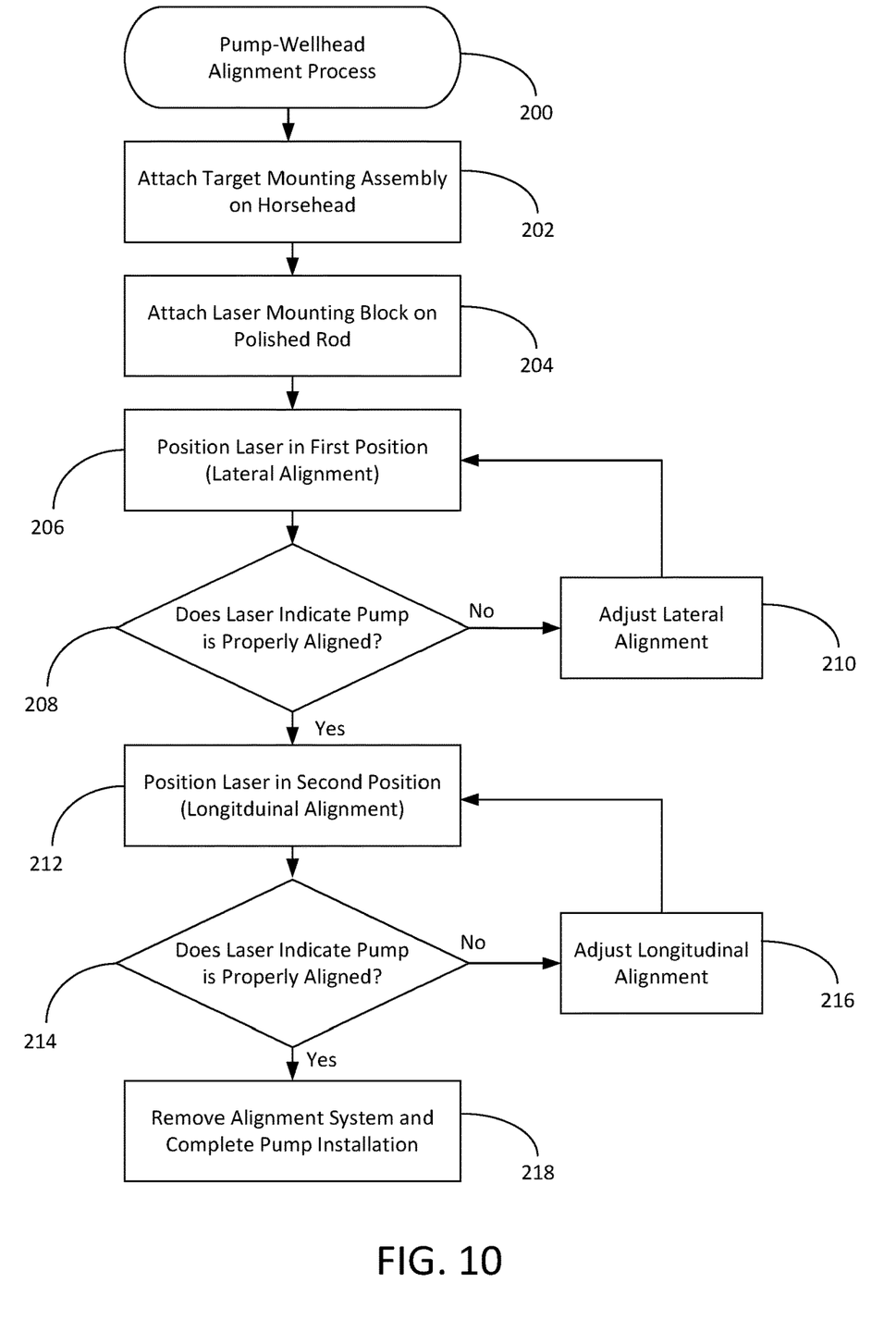
FIG. 10 is a flowchart depicting a pump-wellhead alignment method.

Thus, the optical alignment system 152 can be used to rapidly, reliably and accurately provide an indication of the alignment between the pump jack 100 and the wellhead 144. Turning to FIG. 10, shown therein is an exemplary embodiment of a method 200 for aligning the pump jack 100 with the wellhead 144. At step 202, the target assembly 154 is attached to the horsehead 132 of the pump jack 100. During this step, the target assembly 154 is secured to the horsehead 132 in a level orientation where the center of the target 158 is located along the same vertical axis that would pass through the polish rod 140 when it is suspended from the horsehead 132 by the bridle 136 and carrier bar 138.

Next, at step 204, the emitter assembly 156 is secured to the polish rod 140. During this step, the base 170 of the emitter assembly 156 is tightened around the polish rod 140 and the emitter 172 is secured between the emitter supports 174. If necessary, a bushing 180 is placed within the aperture 176 before the base 170 is placed over or onto the polish rod 140.

The method 200 continues at step 206, where the emitter assembly 156 is moved to a first position to determine the lateral alignment between the pump jack 100 and the wellhead 144. The emitter assembly 156 is activated and draws a continuous laser line that is substantially parallel with the longitudinal axis between the pump jack 100 and the wellhead 144 (as illustrated in FIG. 8).

At decision step 208, a visual determination is made about whether the pump jack 100 is laterally aligned with the polish rod 140 and wellhead 144. If not, the method 200 moves to step 210 and the lateral position of the pump jack 100 is adjusted. The method 200 then returns to step 206 and the steps of measuring and adjusting the lateral position of the pump jack 100 are repeated until proper alignment is achieved. At that point, the method 200 passes to step 212, where the emitter assembly 156 is rotated approximately 90° to a second position.

In the second position, the emitter assembly 156 emits a vertical, line that is substantially parallel to the lateral axis extending between the pump jack 100 and the wellhead 144 (as illustrated in FIG. 9). At decision step 214, a visual determination is made about whether the pump jack 100 is longitudinally aligned with the polish rod 140 and wellhead 144. If not, the method 200 moves to step 216 and the longitudinal position of the pump jack 100 is adjusted. The method 200 then returns to step 212 and the steps of measuring and adjusting the longitudinal position of the pump jack 100 are repeated until proper alignment is achieved. At that point, the method 200 passes to step 218, where the optical alignment system 152 is removed from the pump jack 100 and polish rod 140. The position of the pump jack 100 can then be fixed and the installation of the pump jack 100 completed.

In an alternate embodiment, the longitudinal alignment between the pump jack 100 and the wellhead 144 is established before evaluating the lateral alignment. Thus, steps 212, 214 and 216 could be exchanged with steps 206, 208 and 210 within the method 200. The order of steps can occur in a variety of sequences unless otherwise specifically limited. The various steps described herein can be combined with other steps, interlineated with the stated steps, and/or split into multiple steps. It will be further understood that the method 200 can take place during the initial installation of the pump jack 100 or during a maintenance operation following the initial installation.

Elements have been described functionally and can be embodied as separate components or can be combined into components having multiple functions. The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to fully protect all such modifications and improvements that come within the scope or range of equivalent of the following claims.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A method for aligning a pump with a wellhead, wherein the pump includes a pump base, the method comprising the following steps:
    attaching a target assembly to the pump, wherein the target assembly includes a target;
    attaching an emitter assembly to the wellhead in a first position;
    emitting a first beam of light from the emitter assembly to the target assembly;
    moving the emitter assembly on the wellhead to a second position, emitting a second beam of light from the emitter assembly to the target assembly, wherein the second beam is angularly offset from the first beam of light;
    determining the position of the pump base with respect to the wellhead by the projection of the first light beam and the second light beam on the target assembly, and
    adjusting the position of the pump base with respect to the wellhead based on the determination of the position of the pump base with respect to the wellhead obtained by the projection of the first light beam and second light beam on the target assembly.

2. The method of claim 1, wherein the pump is a pump jack that includes a horsehead and the step of attaching the target assembly further comprises securing the target assembly to the horsehead.

3. The method of claim 2, wherein the horsehead includes an arcuate front face and wherein the step of attaching the target assembly further comprises securing the target assembly to the horsehead below an apex of the arcuate front face.

4. The method of claim 2, wherein the step of attaching the target assembly to the horsehead further comprises using a pair of opposing clamps to retain the target assembly in the center of the arcuate front face of the horsehead.

5. The method of claim 1, wherein a lower portion of a polish rod is retained within the wellhead and wherein the step of attaching an emitter assembly further comprises securing a base of the emitter assembly to an upper portion of the polish rod.

6. The method of claim 1, wherein the step of attaching an emitter assembly further comprises the steps of:
    attaching the emitter assembly to a chain clamp; and
    securing the chain clamp to the wellhead.

7. The method of claim 1, wherein the step of emitting a first beam of light from the emitter assembly to the target assembly comprises projecting a continuous laser line on the target.

8. The method of claim 7, wherein the continuous laser line is projected on the target along a longitudinal axis extending between the pump and the wellhead.

9. The method of claim 8, wherein the step of determining the position of the pump with respect to the wellhead further comprises determining a lateral offset of the pump and the wellhead in response to the projection of the light beam on the target assembly.

10. The method of claim 7, wherein the continuous laser line is projected on the target along a lateral axis extending between the pump and the wellhead.

11. The method of claim 10, wherein the step of determining the position of the pump with respect to the wellhead further comprises determining a longitudinal offset of the pump and the wellhead in response to the projection of the light beam on the target assembly.

12. The method of claim 1, wherein the step of moving the emitter assembly on the wellhead in a second position comprises rotating the emitter assembly about the wellhead.

13. A method for aligning a pump with a wellhead, wherein a polish rod extends upward from the wellhead and wherein the pump includes a pump base, the method comprising the steps of:
    attaching a target assembly to the pump, wherein the target assembly includes a target;
    attaching an emitter assembly to the polish rod in a first position, wherein the emitter assembly is rotatably attached to the polish rod;
    emitting a first beam of light from the emitter assembly to project a first line on the target assembly, wherein the first line is indicative of a lateral alignment between the pump base and the wellhead;
    determining the lateral alignment of the pump base with respect to the wellhead based on the projection of the first line on the target assembly;
    adjusting the position of the pump base based on the lateral alignment of the pump base with respect to the wellhead;
    rotating the emitter assembly to a second position on the polish rod;
    emitting a second beam of light from the emitter assembly to project a second line on the target assembly, wherein the second line is indicative of a longitudinal alignment between the pump base and the wellhead;
    determining the longitudinal alignment of the pump base with respect to the wellhead based on the projection of the second line on the target assembly; and
    adjusting the position of the pump base based on the longitudinal alignment of the pump base with respect to the wellhead.

14. The method of claim 13, wherein the pump includes a horsehead that has an arcuate front face and wherein the step of attaching a target assembly to the pump further comprises attaching the target assembly to the horsehead below an apex of the arcuate front face.

15. The method of claim 14, wherein the step of attaching the target assembly to the horsehead further comprises using a pair of opposing clamps to retain the target assembly in the center of the arcuate front face of the horsehead.

16. A method for aligning a pump with a wellhead, wherein a polish rod extends upward from the wellhead and wherein the pump includes a pump base, the method comprising the steps of:
    attaching a target assembly to the pump, wherein the target assembly includes a target;
    attaching an emitter assembly to the polish rod in a first position, wherein the emitter assembly is rotatably attached to the polish rod;
    emitting a first beam of light from the emitter assembly to project a first line on the target assembly, wherein the first line is indicative of a longitudinal alignment between the pump base and the wellhead;
    determining the longitudinal alignment of the pump base with respect to the wellhead based on the projection of the first line on the target assembly;

adjusting the position of the pump base based on the longitudinal alignment of the pump base with respect to the wellhead;

rotating the emitter assembly to a second position on the polish rod;

emitting a second beam of light from the emitter assembly to project a second line on the target assembly, wherein the second line is indicative of a lateral alignment between the pump base and the wellhead;

determining the lateral alignment of the pump base with respect to the wellhead based on the projection of the second line on the target assembly; and adjusting the position of the pump base based on the lateral alignment of the pump base with respect to the wellhead.

* * * * *